US008108253B2

(12) United States Patent
Poon et al.

(10) Patent No.: US 8,108,253 B2
(45) Date of Patent: Jan. 31, 2012

(54) IDENTIFYING ADVERTISING SPECIALIST

(75) Inventors: Andrew W. Poon, Palo Alto, CA (US);
Walter Lee, San Francisco, CA (US);
Mircea Oancea, Santa Clara, CA (US);
Juan C. Nuno, San Francisco, CA (US);
Robert Lee, Mountain View, CA (US);
Anton Koinov, Santa Clara, CA (US);
Stacey Kapadia, Mountain View, CA (US)

(73) Assignee: Google Inc., Mountain View, CA (US)

( * ) Notice: Subject to any disclaimer, the term of this patent is extended or adjusted under 35 U.S.C. 154(b) by 794 days.

(21) Appl. No.: 12/030,523

(22) Filed: Feb. 13, 2008

(65) Prior Publication Data
US 2008/0201186 A1 Aug. 21, 2008

Related U.S. Application Data

(60) Provisional application No. 60/889,727, filed on Feb. 13, 2007.

(51) Int. Cl.
*G06Q 40/00* (2006.01)
(52) U.S. Cl. ............... 705/14.1; 705/14.16; 705/14.41; 705/14.43; 705/14.49; 705/14.67
(58) Field of Classification Search ............... 705/14.16, 705/14.41, 14.43, 14.49, 14.67
See application file for complete search history.

(56) References Cited

U.S. PATENT DOCUMENTS

| 2002/0023094 A1 | 2/2002 | Kohda et al. |
| 2005/0223002 A1 | 10/2005 | Agarwal et al. |
| 2006/0069613 A1 | 3/2006 | Marquardt |
| 2006/0259357 A1 | 11/2006 | Chiu |

FOREIGN PATENT DOCUMENTS

| KR | 10-2001-0069782 | 7/2001 |
| KR | 10-2001-0113258 | 12/2001 |
| KR | 10-2002-0029265 | 4/2002 |
| KR | 10-2003-0000161 | 1/2003 |

OTHER PUBLICATIONS

Notification of Transmittal of The International Search Report and The Written Opinion of the International Searching Authority of Application No. PCT/US2008/053868, filed Feb. 13, 2008, mailed Jun. 27, 2008 (12 pages).
Notification of Transmittal of The International Search Report and The Written Opinion of the International Searching Authority of Application No. PCT/US2008/053854, filed Feb. 13, 2008, and mailed Jun. 25, 2008 (10 pages).

*Primary Examiner* — Daniel Felten
(74) *Attorney, Agent, or Firm* — Fish & Richardson P.C.

(57) ABSTRACT

The present disclosure includes a system and method for identifying advertising specialist. In some implementations, a method includes receiving information associated with a plurality of advertising specialist. One or more profiles associated with each advertising specialist is generated. The specialist profiles are filtered based, at least in part, on criteria received from a user.

9 Claims, 11 Drawing Sheets

IDENTIFYING ADVERTISING SPECIALIST

CLAIM OF PRIORITY

This application claims priority under 35 USC §119(e) to U.S. Patent Application Ser. No. 60/889,727, filed on Feb. 13, 2007, the entire contents of which are hereby incorporated by reference.

TECHNICAL FIELD

This invention relates to advertising.

BACKGROUND

Content delivery over the internet continues to improve every day. Computer users can receive e-mail, news, games, entertainment, music, books, and web pages-all with a simple Internet connection (and with improved quality on a broadband connection). Internet users also have access to a plethora of services such as maps, shopping links, images, blogs, local search, satellite images, group discussions, hosted content, and e-mail. These service providers may track users' interactions with such services to determine associated metrics and/or modify these services based on such interactions to further enhance the user experience.

SUMMARY

The present disclosure includes a system and method for identifying advertising specialist. In some implementations, a method includes receiving information associated with a plurality of advertising specialist. One or more profiles associated with each advertising specialist is generated. The specialist profiles are filtered based, at least in part, on criteria received from a user.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
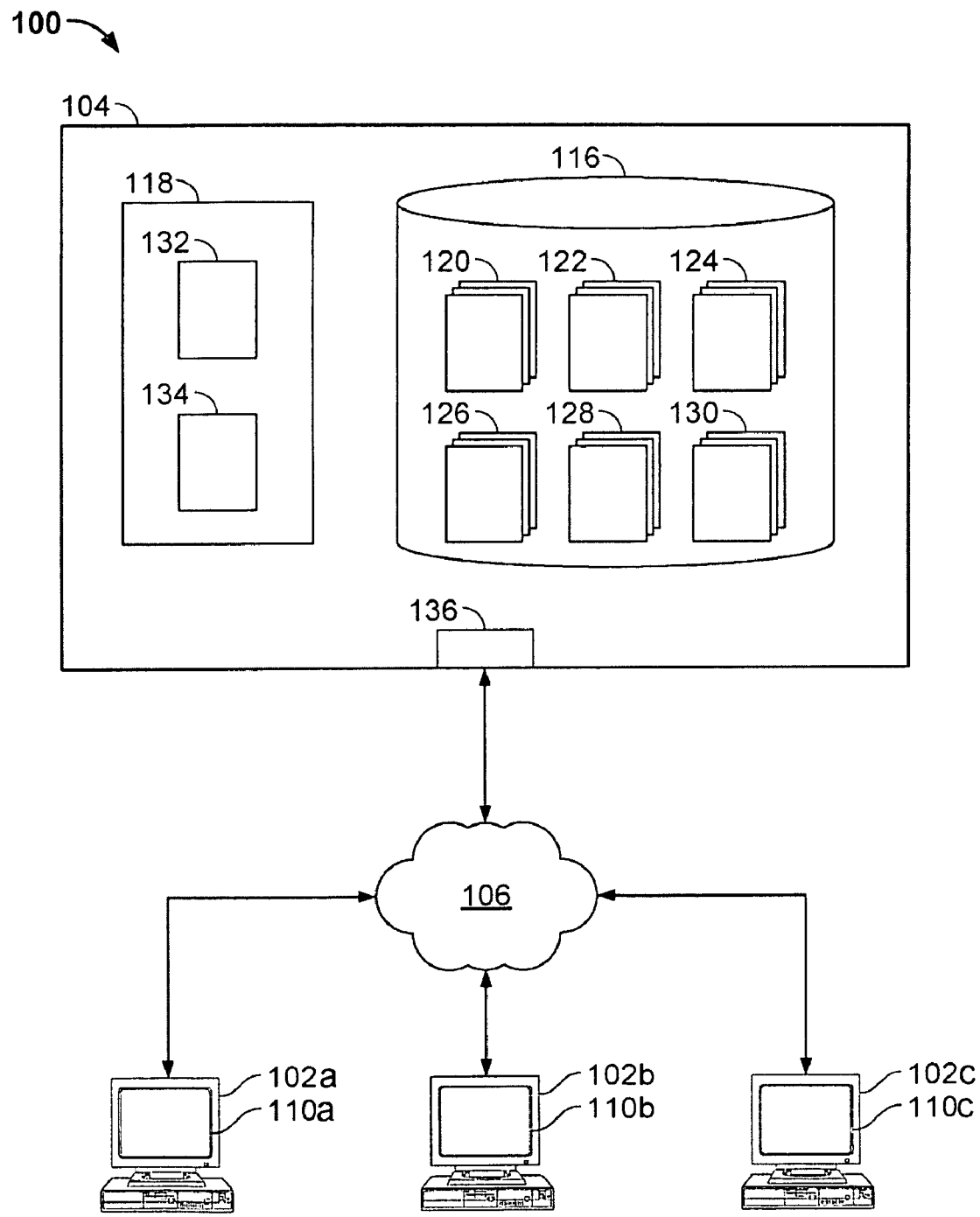
FIG. 1 is a block diagram illustrating an example for identifying one or more ad specialist in accordance with some implementations of the present disclosure.

FIG. 1 is a block diagram illustrating an example system 100 for identifying one or more advertisement ("ad") specialist. An ad specialist may include an entity (e.g., individual, enterprise) that produces and/or assists in the production an ad in accordance with a request from a third party such as an advertiser. In some implementations, the system 100 may identify one or more parameters associated with a requested ad, and using these parameters, identify one or more ad specialist in accordance with the ad parameters. For example, the user may submit a request for ad specialist that has experience in producing television ads directed to certain demographic. In addition to identifying ad specialist, the system 100 may perform one or more of the following: enable the user and the identified ad specialist to work together, rate the specialist using feedback from the user and/or success of the ad, receiving payment for the ad based on previously agreed terms, distribute and/or track the ad, and/or generate feedback for the ad in accordance with tracking information. In performing one or more these functions, the system 100, in some implementations, may provide an end-to-end ad creation/distribution system in one or more media (e.g., audio, video).

In the implementation shown, system 100 includes clients 102 and a specialist server 104 coupled via network 106. Clients 102*a-c* are any devices (e.g., computing devices) operable to connect or communicate with specialist server 104 or network 106 using any communication link. Each client 102 includes, executes, or otherwise presents a Graphical User Interface (GUI) 110 and comprises an electronic device operable to receive, transmit, process and store any appropriate data associated with system 100. While the illustrated implementation includes clients 102*a-c*, system 100 may include any number of clients 102 communicably coupled to specialist server 104. Further, "client 102" and "user" may be used interchangeably as appropriate without departing from the scope of this disclosure. Moreover, for ease of illustration, each client 102 is described in terms of being used by one user. But this disclosure contemplates that many users may use one device or that one user may use multiple devices.

As used in this disclosure, a user of client 102 is any person, department, organization, small business, enterprise, or any other entity that may use or request others to use system 100. Client 102 is intended to encompass a personal computer, touch screen terminal, workstation, network computer, kiosk, wireless data port, smart phone, personal data assistant (PDA), one or more processors within these or other devices, or any other suitable processing or electronic device used by a user viewing content from the specialist server 104. For example, client 102 may be a PDA operable to wirelessly connect with an external or unsecured network. In another example, client 102 may comprise a laptop that includes an input device, such as a keypad, touch screen, mouse, or other device that can accept information, and an output device that conveys information associated with an advertisement of specialist server 104, including digital data, visual information, or GUI 110. Both the input device and output device may include fixed or removable storage media such as a magnetic computer disk, CD-ROM, or other suitable media to both receive input from and provide output to users of clients 102 through the display, namely the client portion of GUI 110.

GUI 110 comprises a graphical user interface operable to allow the user of client 102 to interface with at least a portion of system 100 for any suitable purpose, such as viewing advertisements. Generally, GUI 110 provides the particular user with an efficient and user-friendly presentation of data provided by or communicated within system 100. GUI 110 may comprise a plurality of customizable frames or views having interactive fields, pull-down lists, and buttons operated by the user. For example, GUI 110 is operable to display Web pages in a user-friendly form based on the user context and the displayed data. It should be understood that the term graphical user interface may be used in the singular or in the plural to describe one or more graphical user interfaces and each of the displays of a particular graphical user interface. Indeed, reference to GUI 110 may indicate a reference to the front-end or a component of evaluation engine 132, as well as the particular interface accessible via client 102, as appropriate, without departing from the scope of this disclosure. Therefore, GUI 110 contemplates any graphical user interface, such as a generic web browser or touch screen, that processes information in system 100 and efficiently presents the results to the user. Specialist server 104 can accept data from client 102 via a the web browser (e.g., Microsoft Internet Explorer or Netscape Navigator) and return the appropriate HTML or XML responses to the browser using network 106.

Specialist server 104 comprises an electronic computing device operable to receive, transmit, process and store data associated with system 100. System 100 can be implemented using computers other than servers, as well as a server pool. Indeed, specialist server 104 may be any computer, electronic or processing device such as, for example, a blade server, general-purpose personal computer (PC), Macintosh, workstation, Unix-based computer, or any other suitable device. In other words, system 100 may include computers other than general purpose computers as well as computers without conventional operating systems. Specialist server 104 may be adapted to execute any operating system including Linux, UNIX, Windows Server, or any other suitable operating system. In certain implementations, specialist server 104 may also include or be communicably coupled with a web server and/or a mail server.

Specialist server 104 includes memory 116 and a processor 118. Memory 116 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, memory 116 includes Web pages 120, request files 122, specialist profiles 124, rating profiles 126, bid files 128, and requested ads 130. Local memory 116 may also include any other appropriate data such as VPN applications or services, firewall policies, a security or access log, print or other reporting files, HTML files or templates, data classes or object interfaces, child software applications or sub-systems, and others.

Web pages 120 comprise displays through which information associated with the production and/or the distribution of ads can be presented to users of clients 102 (e.g., FIGS. 3A-G). In general, Web pages 120 include any machine readable and machine storable work product that may generate or be used to generate a display through GUI 110. Web pages 112 may be a file, a combination of files, one or more files with embedded links to other files, or any other suitable configuration. Web pages 120 may include text, audio, image, video, animation, and other attributes. In short, Web pages 120 comprise any source code or object code for generating a display that provides information for enabling users to perform one or more functions of the ad creation/distribution process. Web page 120 may be written in or based on any suitable programming language such as HTML.

Request profiles 122 include any parameters, variables, policies, instructions, settings, rules or directives for defining attributes of requested ads 130. For example, the ad attributes may include: a budget, a deadline, services requested (e.g., script writing, voiceover, special effects, production, music), advertised product and/or service, target customers, target locations, messages to convey, and/or others associated with the requested ad 130 and/or associated service and/or product. Of course, the above attributes are for example purposes and may not reflect some implementations within the scope of this disclosure. Regardless of the specific settings included or defined in profile 122, the client 102 may select these attributes through one or more Web pages 120 (e.g., FIGS. 3A-G). Each profile 122 may be associated with a request for a specific ad or multiple profiles 122 may be associated with the ad request. In some implementations, a user may be associated with a single request profile 122 or multiple request profiles 122 or multiple users may be associated with a single request profile 122. For example, two different profiles 122 may present a request from a user for two different ads. Profiles 122 may be stored in one or more tables stored in a relational database described in terms of SQL statements or scripts. In other implementations, profiles 122 may be formatted, stored, or defined as various data structures in text files, Hyperlink Text Markup Language (HTML) files, eXtensible Markup Language (XML) documents, Virtual Storage Access Method (VSAM) files, flat files, Btrieve files, comma-separated-value (CSV) files, internal variables, or one or more libraries. In short, profiles 122 may comprise one table or file or a plurality of tables or files stored on one computer or across a plurality of computers in any appropriate format. Moreover, profiles 122 may be local or remote without departing from the scope of this disclosure and store any type of appropriate data.

Specialist profiles 124 include one or more data entries or structure operable to identify information associated with ad specialists. For example, the specialist profile 124 may identify that an ad specialist specializes in video ads and has produced a certain number of ads. In some implementations, the specialist profile 124 may include one or more of the following: types of services provided (e.g., script writing, voiceover, production, music, singing, sound effects), years of experience, types of experience, sample work (e.g., previously requested ad), types of fee structures (e.g., buyout, pay per play), language, and/or others. In some implementations, an ad specialist may be associated with a single specialist profile 124 or multiple specialist profiles 124 or multiple ad specialist may be associated with a single specialist profile 124. Profiles 124 may be stored in one or more tables stored in a relational database described in terms of SQL statements or scripts. In other implementations, profiles 124 may be formatted, stored, or defined as various data structures in text files, HTML documents, XML documents, VSAM files, flat files, Btrieve files, CSV files, internal variables, or one or more libraries. In short, profiles 124 may comprise one table or file or a plurality of tables or files stored on one computer or across a plurality of computers in any appropriate format. Moreover, profiles 124 may be local or remote without departing from the scope of this disclosure and store any type of appropriate data.

Ratings profiles 126 includes one or more data entries or structure operable to define one or more ratings associated with ad specialists. For example, the ratings profile 126 may define one or more ratings associated with the performance of ads produced by the ad specialist as well as ratings based on feedback provided by one or more users. The ratings profile 126 may include one or more of the following: a performance rating, feedback ratings associated with different questions provided to users, an overall ratings, ratings based on different types of ads (e.g., audio, video), conversion rates associated with ads produced by a specialist, and other information. In some implementations, an ad specialist may be associated with a single ratings profile 126 or multiple ratings profiles 126 or multiple ad specialist may be associated with a single ratings profile 126. Profiles 126 may be stored in one or more tables stored in a relational database described in terms of SQL statements or scripts. In other implementations, profiles 126 may be formatted, stored, or defined as various data structures in text files, HTML documents, XML documents, VSAM files, flat files, Btrieve files, CSV files, internal variables, or one or more libraries. In short, profiles 126 may comprise one table or file or a plurality of tables or files stored on one computer or across a plurality of computers in any appropriate format. Moreover, profiles 126 may be local or remote without departing from the scope of this disclosure and store any type of appropriate data.

Bid files 128 include one or more data structures or entries that identify bids associated with requested ads 130. For example, a bid file 128 may identify bids and/or bid types (e.g., buyout, pay per play) submitted by ad specialists to produce a requested ad 130. Bid file 128 may include one or more of the following: a bid amount, a production date, type of filming (e.g., on location, gather content), specific services (e.g., voice over, live acting, music), a bid type, and/or other information associated with the production and/or purchase of a requested ad 130. Each bid file 128 may be associated with a single requested ad 130 or multiple requested ads 130. Alternatively or in addition, each bid file 128 may be associated with a single user, a single ad specialist, multiple users, and/or multiple ad specialists. In some implementations, an ad specialist may be associated multiple bid files 128. Bid files 128 may be stored in one or more tables stored in a relational database described in terms of SQL statements or scripts. In other implementations, bid file 128 may be formatted, stored, or defined as various data structures in text files, HTML documents, XML documents, VSAM files, flat files, Btrieve files, CSV files, internal variables, or one or more libraries. In short, bid file 128 may comprise one table or file or a plurality of tables or files stored on one computer or across a plurality of computers in any appropriate format. Moreover, bid file 128 may be local or remote without departing from the scope of this disclosure and store any type of appropriate data.

Requested ads 130 include any parameters, pointers, variables, algorithms, instructions, rules, files, links, or other data for easily providing secondary content. For example, the requested ad 130 may comprise an audio ad, a video ad, or other type of ad. Such ads 130 may include (among other things) primary content, secondary content, and/or sponsored content. For example, the requested ad 130 may include a text element, a graphics element, a multimedia element, an audio segment, or any other audio, graphical and/or display element. In a more specific example, the requested ad 130 may include or reference a publicly-available web page (or portion thereof), a telephone number, an internal e-mail, the user's personal contact information, weather information, a profit and loss report of a company, an OLAP (on-line analytical processing) report, portion of a sales order, as well as many others. In certain implementations, requested ads 130 (or pointers thereto) may be stored in one or more tables in a relational database described in terms of SQL statements or scripts. In certain implementations, requested ads 130 may be formatted, stored, or defined as various data structures. For example, a particular requested ad 130 may merely be a pointer to a third party ad stored remotely. In another example, a particular requested ad 130 may be an internally stored advertisement for a tightly coupled service. In short, requested ads 130 may comprise one table or file or a plurality of tables or files stored on one computer or across a plurality of computers in any appropriate format. Indeed, some or all of requested ads 130 may be local or remote without departing from the scope of this disclosure and store any type of appropriate data.

Processor 118 executes instructions and manipulates data to perform operations of specialist server 104. Although FIG. 1 illustrates a single processor 118 in server 104, multiple processors 118 may be used according to particular needs, and reference to processor 118 is meant to include multiple processors 118 where applicable. In the illustrated implementation, processor 118 executes request engine 132 and management engine 134. The request engine 132 can be of the form of software, for example, operable to manage request for ad production. For example, the request engine 132 may identify one or more ad specialist in accordance with the ad request. In some implementations, the request engine 132 may perform one or more of the following: receive a request for ad from client 102, generate and/or update a request profile 122 in accordance with information received from the client 102, identify one or more ad specialist using the specialist profiles 124 and/or the request profile 122, and/or other functions associated with the creation of a requested ad 130. In some implementations, the request engine 132 dynamically generates a Web page 120 based on one or more parameters. In this case, the request engine 132 may identify one or more parameters associated with the user, the ad specialist, the request ad 130, and/or other information associated with the system 100. For example, the request engine 132 may dynamically generate a Web page 120 based on previous user actions such as previous selections of the user. The previous selections may include providing values for one or more filters associated with an ad specialist.

Management engine 134 can be of the form of software, for example, operable to manage the release of a requested ad 132. For example, the management engine 134 may identify a type of payment in bid files 128 and release the requested ad 132 to the user in response to the user submitting a payment. In some implementations, the management engine 134 may perform one or more of the following functions: identify a status of a requested ad 132, transmits a notification to the user that payment is due, identify receipt of payment from the user, release the requested ad 132 to the user in response to receipt of the payment, and/or others. In some implementations, the management engine 134 may release the requested ad 132 to the user regardless of whether a payment has been verified.

Regardless of the particular implementation, "software," as used herein, may include software, firmware, wired or programmed hardware, or any combination thereof as appropriate. Indeed, evaluation engine 132 and criteria engine 134 may be written or described in any appropriate computer language including C, C++, Java, J#, Visual Basic, assembler, Perl, any suitable version of 4GL, as well as others. It will be understood that while request engine 132 and management engine 134 are illustrated in FIG. 1 as including individual modules, each of request engine 132 and management engine 134 may include numerous other sub-modules or may instead be a single multi-tasked module that implements the various features and functionality through various objects, methods, or other processes. Further, while illustrated as internal to server 104, one or more processes associated with request engine 132 and/or management engine 134 may be stored, referenced, or executed remotely. Moreover, request engine 132 and/or management engine 134 may be a child or sub-module of another software module or enterprise application (not illustrated) without departing from the scope of this disclosure.

Specialist server 104 may also include interface 136 for communicating with other computer systems, such as clients 102, over network 106 in a client-server or other distributed environment. In certain implementations, specialist server 104 receives data from internal or external senders through interface 136 for storage in local memory 116 and/or processing by processor 118. Generally, interface 136 comprises logic encoded in software and/or hardware in a suitable combination and operable to communicate with network 106. More specifically, interface 136 may comprise software supporting one or more communications protocols associated with communications network 106 or hardware operable to communicate physical signals.

Network 106 facilitate wireless or wireline communication between server 104 and any other local or remote computer, such as clients 102. Network 106 may be all or a portion of an enterprise or secured network. While illustrated as single network, network 106 may be a continuous network logically divided into various sub-nets or virtual networks without departing from the scope of this disclosure, so long as at least portion of network 106 may facilitate communications of ad creation/distribution information between server 104 and at least one client 102. In some implementations, network 106 encompasses any internal or external network, networks, sub-network, or combination thereof operable to facilitate communications between various computing components in system 100. Network 106 may communicate, for example, Internet Protocol (IP) packets, Frame Relay frames, Asynchronous Transfer Mode (ATM) cells, voice, video, data, and other suitable information between requested addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, the client 102 transmit a request to the specialist server 104 to identify one or more ad specialist to facilitate the production of an ad. In response to at least the request, the request engine 132 identifies and/or dynamically generates one or more Web pages 120 including one or more filters associated with an ad request and transmits the Web pages 120. In response to receiving selections associated with the one or more filters, the client 102 transmits values for the filters to the request engine 132. Based, at least in part, on the filter values, the request engine 132 generates and/or updates one or more request profiles 122 associates with the ad request. In accordance with the filter values, the request engine 132 identifies one or more ad specialist using the specialist profiles 124. The request engine 132 populates and/or generates one or more Web pages 120 including information associated with the identified specialist and transmits the Web pages 120 to the client 102.

Figure 2:
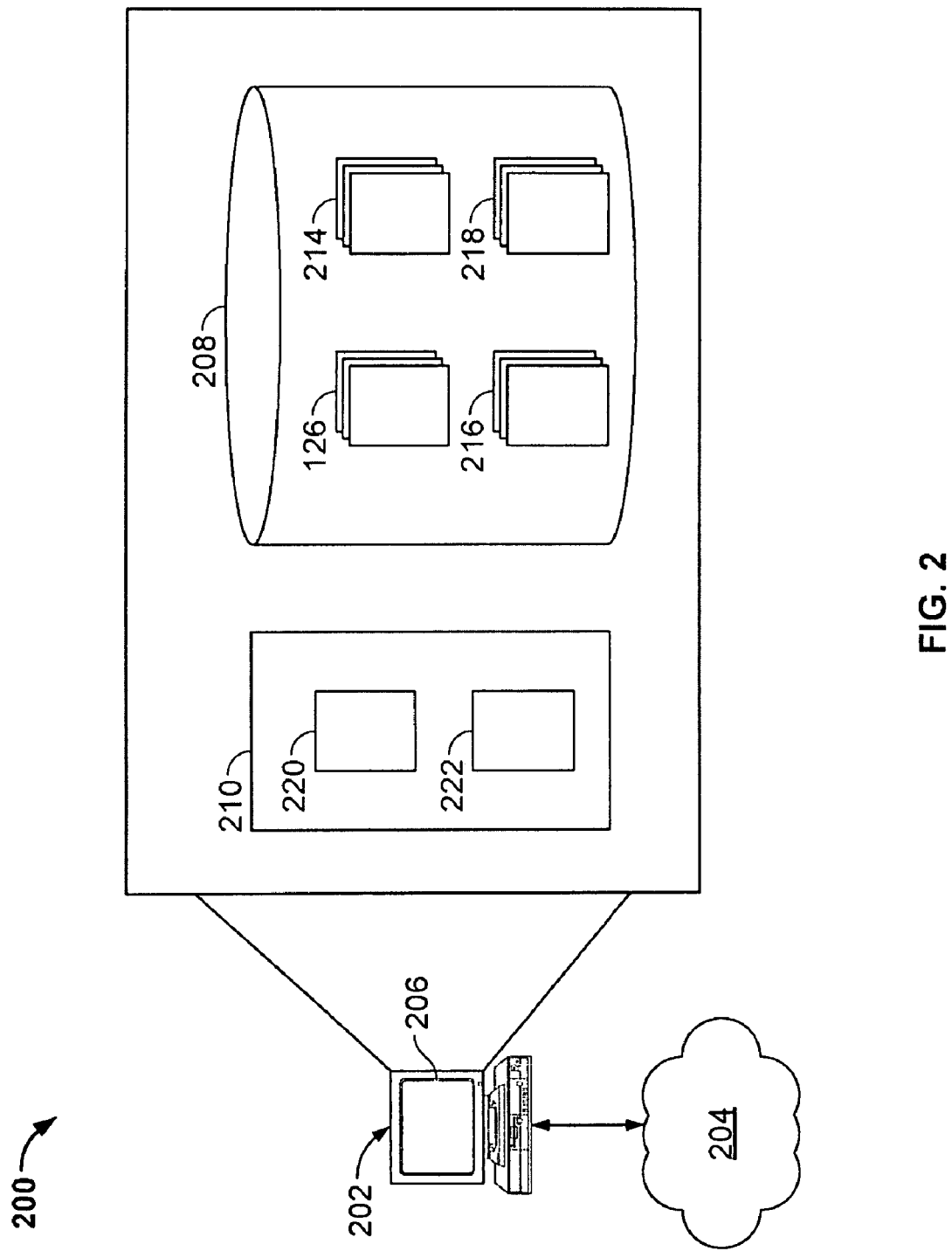
FIG. 2 is a block diagram illustrating an example management system for managing the distribution of requested advertisements.

FIG. 2 illustrates a system 200 for determining metrics associated with an ad specialist. Metrics may include number of conversions associated with a requested ad 130, number of inquiries associated with a requested ad 130, action rates, revenue per thousand ads (RPM), conversions per dollars spent, specialist ratings based on viewer actions, specialist ratings based on user feedback, and/or other metrics. Actions may include one or more of the following: a purchase, a specified time of viewing, filling in a form, an inquiry, and/or other actions associated with a viewer of an advertisement. For example, system 200 may dynamically modify ratings associated with an ad specialist based, at least in part, on purchase rates associated ads 130 produced by the ad specialist. Dynamically, as used herein, generally means that the appropriate processing is determined at run-time based upon the appropriate information. Based at least in part on viewer actions, system 200 may update such ad specialist ratings to illustrate attributes of an ad specialist (e.g., customer satisfaction, effectiveness of ads). For example, the system 200 may use the conversion rates associated with a requested ad 130 to determine a rating for an ad specialist. In addition, the system 200 may determine the cost charged to the user based, at least in part, on the performance of the ad 130. In some implementations, the cost charged to the user may be proportional to the performance of a requested ad 130. In some implementations, the performance of an ad 130 may be determined based on viewer actions such as conversion rates.

At a high level, the system 200, in some implementations, may be a single the computer 202 or any portion of a distributed or enterprise system including at least the computer 202, perhaps communicably coupled to a network 204. In the illustrated implementation, the computer 102 includes a GUI 206, a memory 208, and a processor 210. In certain embodiments, the computer 202 further includes or references a tracking files 212 and rating profiles 126 that may be stored in memory 208 and may be processed by processor 210. FIG. 2 illustrates only one example of a computer that may be used with the disclosure. The present disclosure contemplates computers other than general purpose computers as well as computers without conventional operating systems. As used in this document, the term "computer" is intended to encompass a mainframe, a personal computer, a client, a server, a workstation, a network computer, a personal digital assistant, a mobile phone, or any other suitable local or remote processing device. Moreover, "computer 202" and "user of computer 202" may be used interchangeably without departing from the scope of this disclosure.

The memory 208 includes the rating profiles 126, the log files 214, evaluation criteria 216, and pricing criteria 218. The log files 212 include one or more data structures or entries that identify or include information that identifies actions associated with one or more requested ads 130. For example, one or more log files 212 may include or identify actions associated with a requested ad 130 (e.g., audio) such as transactions associated with the presentation of the requested ad 130. In some implementations, the log files 212 may identify or include information that identifies one or more of the following parameters: media type, event, document, times, dates, actions (e.g., purchase, inquiry), identifier for the requested ad 130, the ad specialist, user, client, a publisher, an advertiser, and/or others. The log file 212 may be associated with a specific requested ad 130, multiple requested ad 130, an ad specialist, multiple ad specialist, a single advertiser or multiple advertisers or multiple log files 212 may be associated with a single ad specialist, a single advertiser, and/or a single content provider 104. In some implementation, the association may be based on a parameter such as demographic, region, or other parameters. For example, a first log file 212 may be associated with a first geographic region and a second log file 212 may be associated with a second geographic region. In some implementations, the log files 212 may be formatted, stored, or defined as various data structures in text files, XML documents, VSAM files, flat files, Btrieve files, CSV files, internal variables, or one or more libraries. In short, the log files 212 may comprise one table or file or a plurality of tables or files stored on one computer or across a plurality of computers in any appropriate format. Moreover, the log files 212 may be local or remote without departing from the scope of this disclosure and store any type of appropriate data.

Evaluation criteria 216 include any parameters, variables, algorithms, instructions, rules, objects or other directives for evaluating ad specialists that produced requested ads 130. For example, the evaluation criteria 216 may be used to determine action rates associated with requested ads 130. In some examples, evaluation criteria 216 may be used to update one or more ratings of an ad specialist in ratings profiles 126 based, at least in part, on actions associated with requested ads 130. As mentioned above, such actions may include one or more of the following: conversions, calls received, inquiries, clicks, click throughs, viewing time, and/or others. In some implementations, evaluation criteria 216 may include mathematical expressions for computing results (e.g., action rates) of the requested ad 130 based on associated actions, criteria for evaluating the results, and/or modifications to one or more rating profiles 126. In terms of computing results, evaluation criteria 216 may identify expressions to determine action rates associated with the requested ads 130. Using such results, evaluation criteria 216 may define criteria such as a logical expression for evaluating the requested ads 130. For example, the criteria may be used to determine a range that the conversion rates fall within. In this case, each range may be associated with a certain number of stars, such as five stars for the highest conversion rates. Alternatively or in combination, the evaluation criteria 216 may be used to rate a specialist received from the user. For example, the evaluation criteria 216 may identify questions and/or parameters (e.g., customer service, quality of ad) that the user answers and/or assigns a value. The evaluation criteria 216 may also identify expressions for determining one or more ratings associated with the ad specialist using the user feedback.

Pricing criteria 218 include any parameters, variables, algorithms, instructions, rules, objects or other directives for determining the cost of producing the ad 130. For example, the pricing criteria 218 may be used to determine the cost based, at least in part, on actions associated with the requested ad 130. In some implementations, the pricing criteria 218 may comprise a cost per action. For instance, the pricing criteria 218 may indicated that the user be charged each time that a viewer performed a specific action (e.g., purchase) in response to a requested ad 130. In some implementations, the pricing criteria 218 may indicate that the cost is based, at least in part, on the number of impressions of the requested ad 130. In some implementations, the evaluation criteria 216 may identify expressions to determine action rates such as inquiry rates or other suitable results associated with the requested ad 130.

Processor 210 executes evaluation engine 220 and pricing engine 222 at any appropriate time such as, for example, in response to a request or input from a user of computer 202 or any appropriate computer system coupled with network 204. Evaluation engine 220 can include any software operable to determine and/or evaluate metrics associated with requested ads 130 based on any suitable process. For example, the evaluation engine 220 may determine ratings for an ad specialist based on one or more parameters. In some implementations, such ratings may be based on feedback provided by users and/or metrics associated with one or more requested ads 130 (e.g., action rates). In the case of evaluating an ad specialist, the evaluation engine 220 may identify log files 214 associated with the ad specialist, evaluated the identified log files 214 using the evaluation criteria 216, and determine at least one rating associated with the ad specialist. In some implementations, prior to evaluating offers, evaluation engine 220 may determine one or more metrics using evaluation criteria 216 and/or log files 214. For example, the evaluation engine 220 may determine a conversion rate for a requested ad 130 produced by the ad specialist using the log files 214. For instance, if the requested ad 130 was presented 100 times with 5000 purchases associated with the requested ad 130, the conversion rate is 50 purchases per impression. Regardless of calculations, the evaluation engine 220 may identify criteria for evaluating the ad specialist using evaluation criteria 216. Criteria may include a number, a range, a threshold, and/or any other suitable criteria for evaluating the requested ad 130. In some implementations, the evaluation engine 132 may compare associated actions and/or action rates and the criteria using any suitable mathematical and/or logical expression. For example, the evaluation engine 132 may determine or otherwise identify ranges associated with certain types of ads using the evaluations criteria 216. For example, the evaluation engine 132 may identify 10 ranges associated with a certain type of ad. In response to satisfying criteria, the evaluation engine 132 may associate a level (e.g., a number of stars) for the ad specialist.

In one aspect of operation, the evaluation engine 220 identifies one or more log files 214 associated with a request ad 130 in response to an event (e.g., expiration of a period of time, a request). Additionally, the evaluation engine 220 identifies one or more evaluation criteria 216 for evaluating information associated with the request ad 130. In some implementations, the evaluation engine 220 identifies expressions for determining one or more metrics associated with the request ad 130. For example, the evaluation engine 220 may identify a mathematical expression for determining action rates associated with the requested ad 130. Using the identified log files 214 and evaluation criteria 216, the evaluation engine 220 determines one or more ratings associated with the ad specialist that produced the requested ad 130. In connect with determining the one or more ratings, the evaluation engine 220 may generate and/or update one or more rating profiles 126 associated with the ad specialist. The pricing engine 222 may determine one or more metrics associated with the requested ad 130 and, using the metrics, determine a cost to charge the user. For example, the pricing engine 222 may determine a number of times the requested ad 130 was presented using the log files 214 and determine a cost using the presentation times and pricing criteria 218. In some implementations, the cost is directly proportional to the presentation times.

FIGS. 3A-G are example web pages 120 for presenting information associated with creating and/or distributing a requested ad 130. It will be understood that the illustrated pages are for example purposes only. Accordingly, GUI 110 may include or present ad information, in any format or descriptive language and each page may present any appropriate advertisements in any layout without departing from the scope of the disclosure.

Figure 3A:
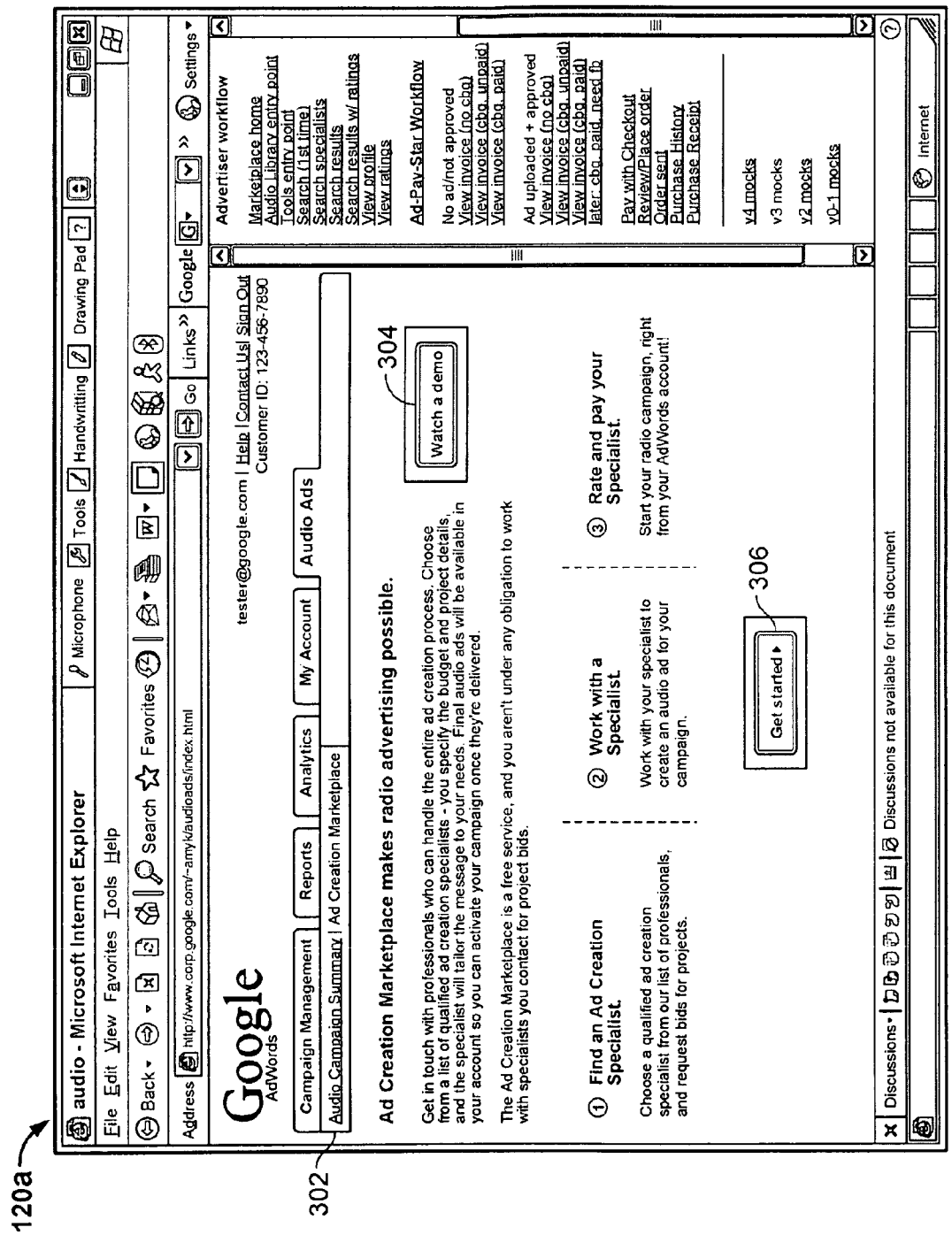
FIGS. 3A-G are example display pages for presenting information associated with the production and/or distribution of advertisements.

Referring to FIG. 3A, the display 120a presents introductory information associated with the ad marketplace. In this example, the display includes tabs 302 and graphical buttons 304 and 306. A user may select different displays using the tabs 302. In this case, the tabs 302 include: Campaign Management, Reports, Analytics, My Account, and Audio Ads. Though, the display may include other tabs 302 such as Video Ads. As for the graphical buttons, a user may select the button 304 to view additional information associated with the ad marketplace such as a demonstration how the systems 100 and 200 may provide production-to-distribution support for the user. The user may select the graphical button 306 to begin the process of filtering through ad specialist and producing an ad.

Figure 3B:
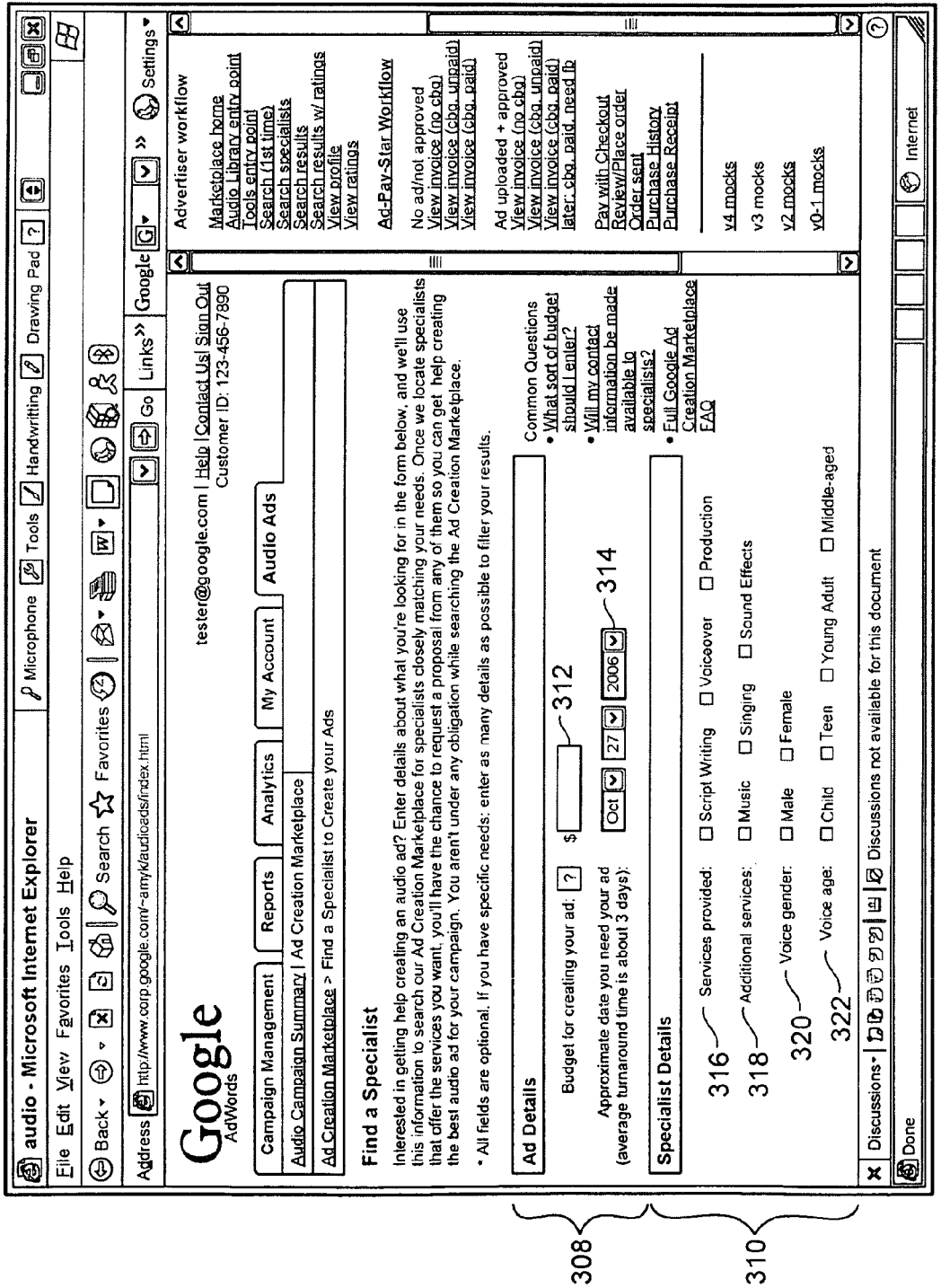

Referring to FIG. 3B, the display 120b presents filters that the user may select for identifying one or more ad specialist.

In the present example, the display 120b includes two sets of filters: Ad Details 308 and Specialist Details 310. The Ad Details 308 include a plurality of filters associated with the specific ad. The Specialist Details 310 include a plurality of filters associated with types of specialist. In this implementation, the Ad Details 308 include a budget field 312 and a date filter 314. The budget field 312 includes a field that the user may approximate the cost that the user is willing to pay for the ad. The date filter 314 includes pull down windows that enable a user to select a date the requested ad 130 will be available. The Specialist Details 310 include services filter 316, additional services filter 318, voice gender 320, and voice age 322. The services filter 316 enables the user to select specific services that the ad specialist may provide for the creation of the ad such as script writing, voiceover, and production. The additional services filter 318 enables a user to select additional services that the ad specialist may provide such as music, singing, and sound effects. The voice-gender filter 320 enables a user to select the gender of the voice used in the ad. The voice-age filter 322 enables a user to select the age of the voice used in the ad. These filters are for example purpose only and the display 120b may include other filters such as visual effects, animation, and others.

Figure 3C:
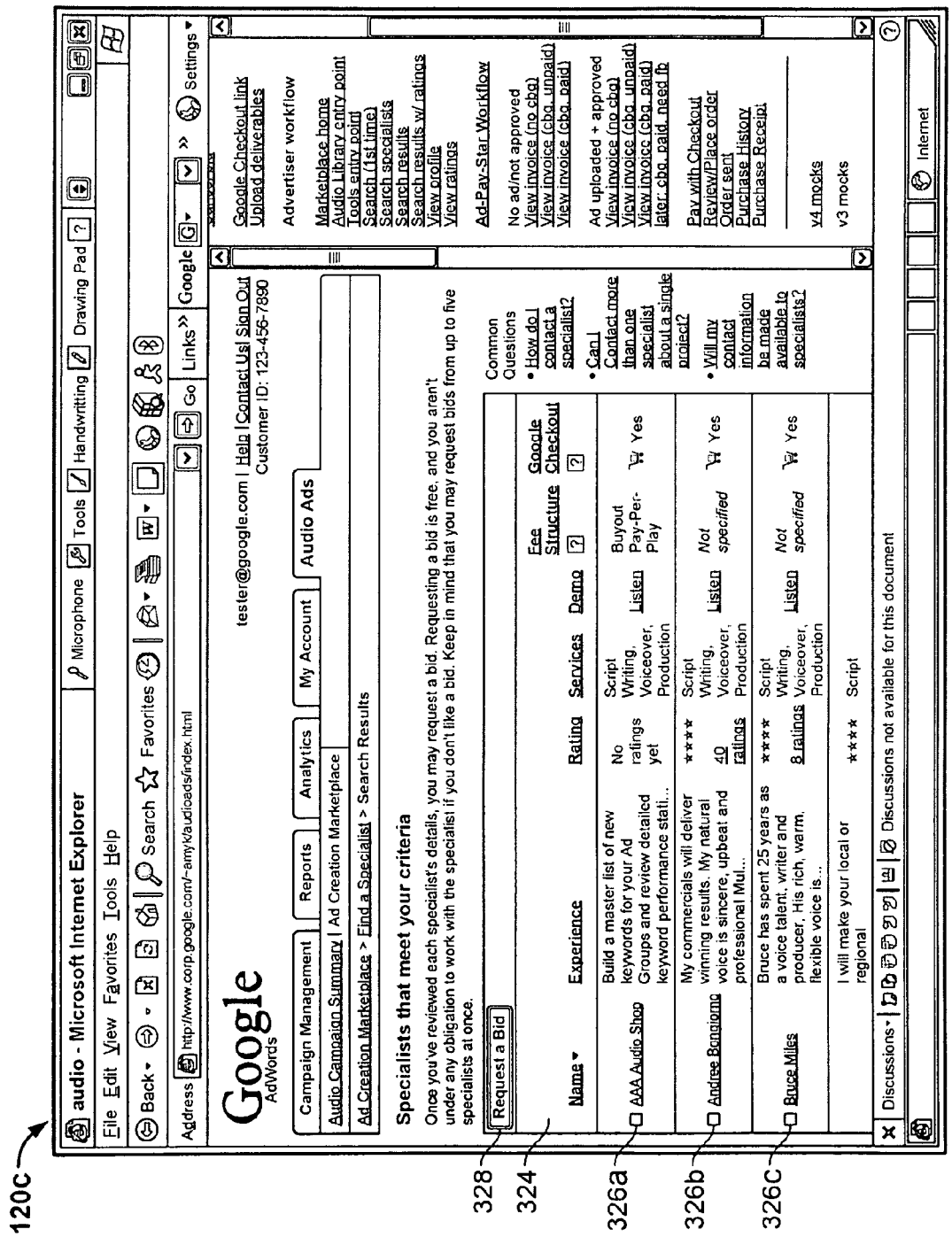

Referring to FIG. 3C, the display 120c presents information associated with one or more ad specialist in accordance with the filter values provided through the display 120b. In some implementations, the display 120c includes a specialist table 324. The specialist table 324 presents information associated with each identified specialist. The specialist table 324 includes rows and columns whose intersection forms a cell that presents information. In the illustrated example, the specialist table 324 includes six columns: Name, Experience, Services, Demo, Fee Structure, and Checkout. Each row is associated with an identified specialist and includes a graphical check box 326. A user may select a check box 326 to request that the associated ad specialist submit a bid for the requested ad 130. After selecting one or more check boxes 326, the user may select the graphic button 328 to transmit the bid requests.

Figure 3D:
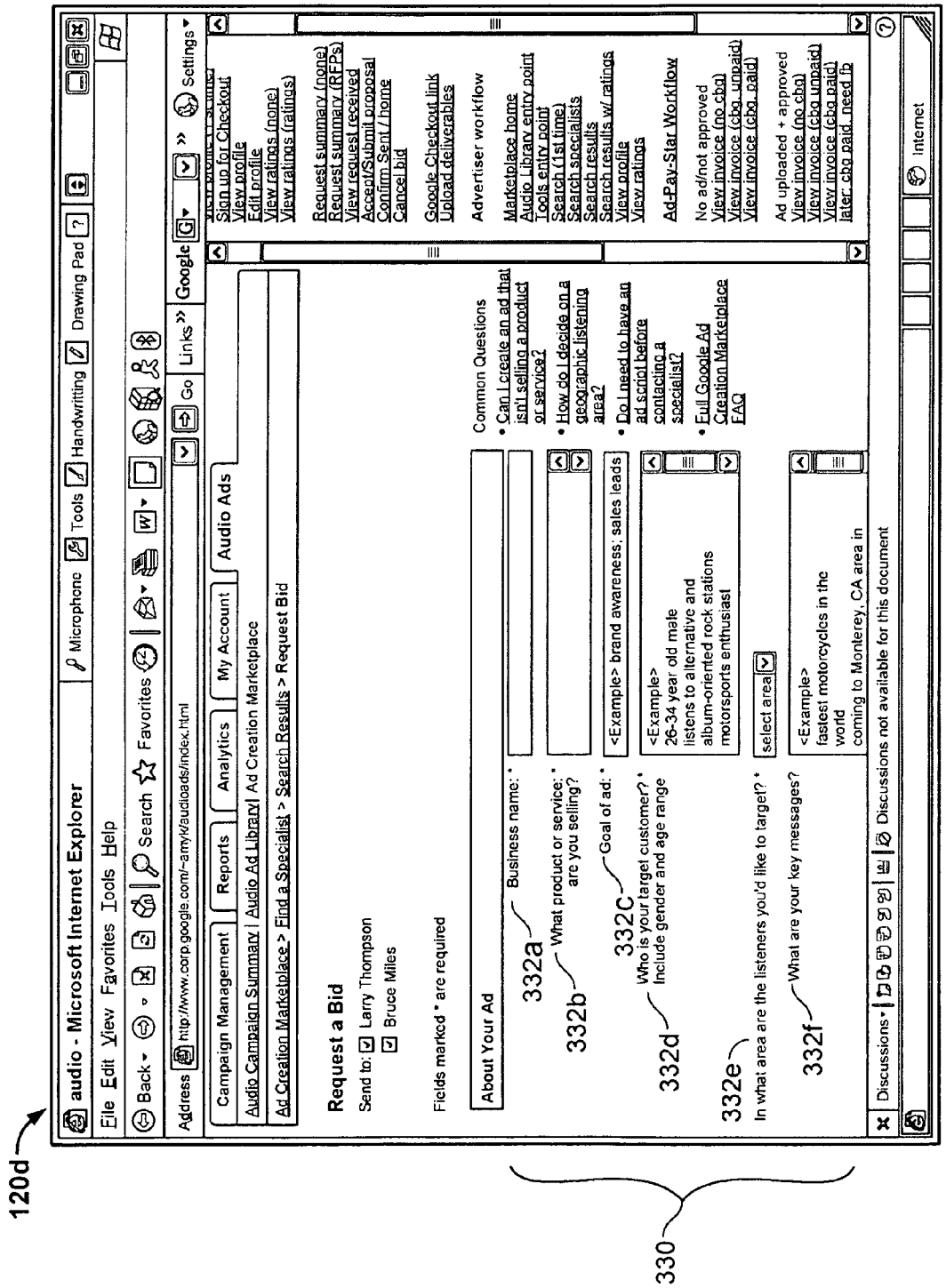

Referring to FIG. 3D, the display 120d presents fields to submit additional information associated with the request ad 130. In some implementations, the display 120d includes an About-Your-Ad section 330 for providing additional information associated with the ad. The section 330 includes the following fields: Business name 332a, item field 332b, goal field 332c, target field 332d, area field 332e, key message filed 332f. The business name 332a enables the user to provide the name of the business requesting the ad services. The user may provide the specific product or service through the item field 332b. The user may indicate the specific goal that the requested ad 130 should accomplish through the goal field 332c. The user may indicate the target audience through the target field 332d. The geographic location for the ad 130 may be provided through the area field 332e. The user may indicate the key message that the requested ad 130 should convey. These fields 332 are for illustrative purposes only and the display 120d may include other fields for providing information associated with the proposed ad.

Figure 3E:
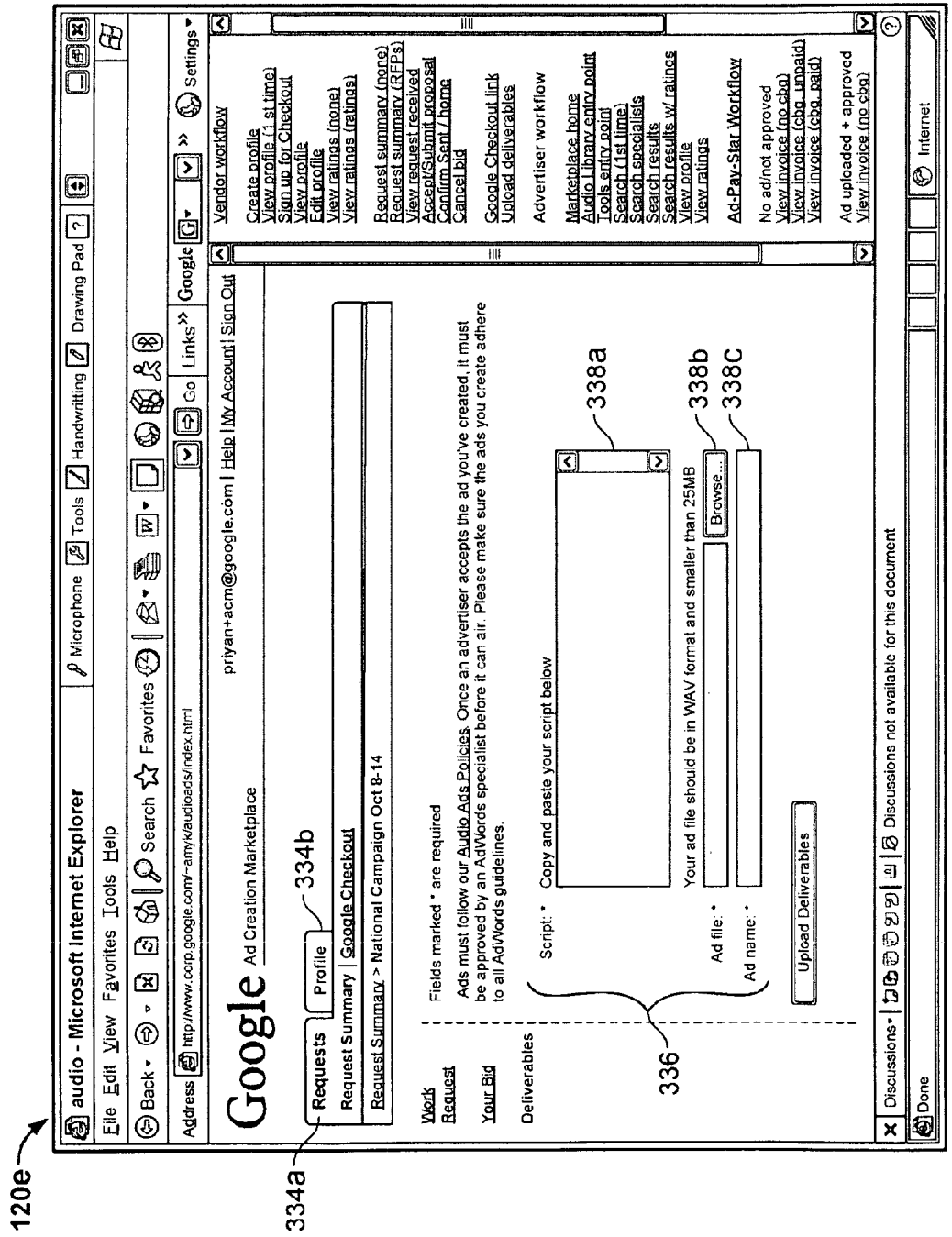

Referring to FIG. 3E, the display 120e presents fields for submitting ad information for approval. In some implementations, the display 120e includes tabs 334 and a submission section 336. The tabs 334 include a request tab 334a for entering a summary of the requested ad 130 and a profile tab 334b. The submission section 336 includes the fields 338 for submitting information associated with the requested ad 130. In the illustrated implementation, the submission section 336 includes a script field 338a for submitting a proposed script, an ad-file field 338b for attaching the requested ad 130, and an ad name 338c for entering the name of the ad 130.

Figure 3F:
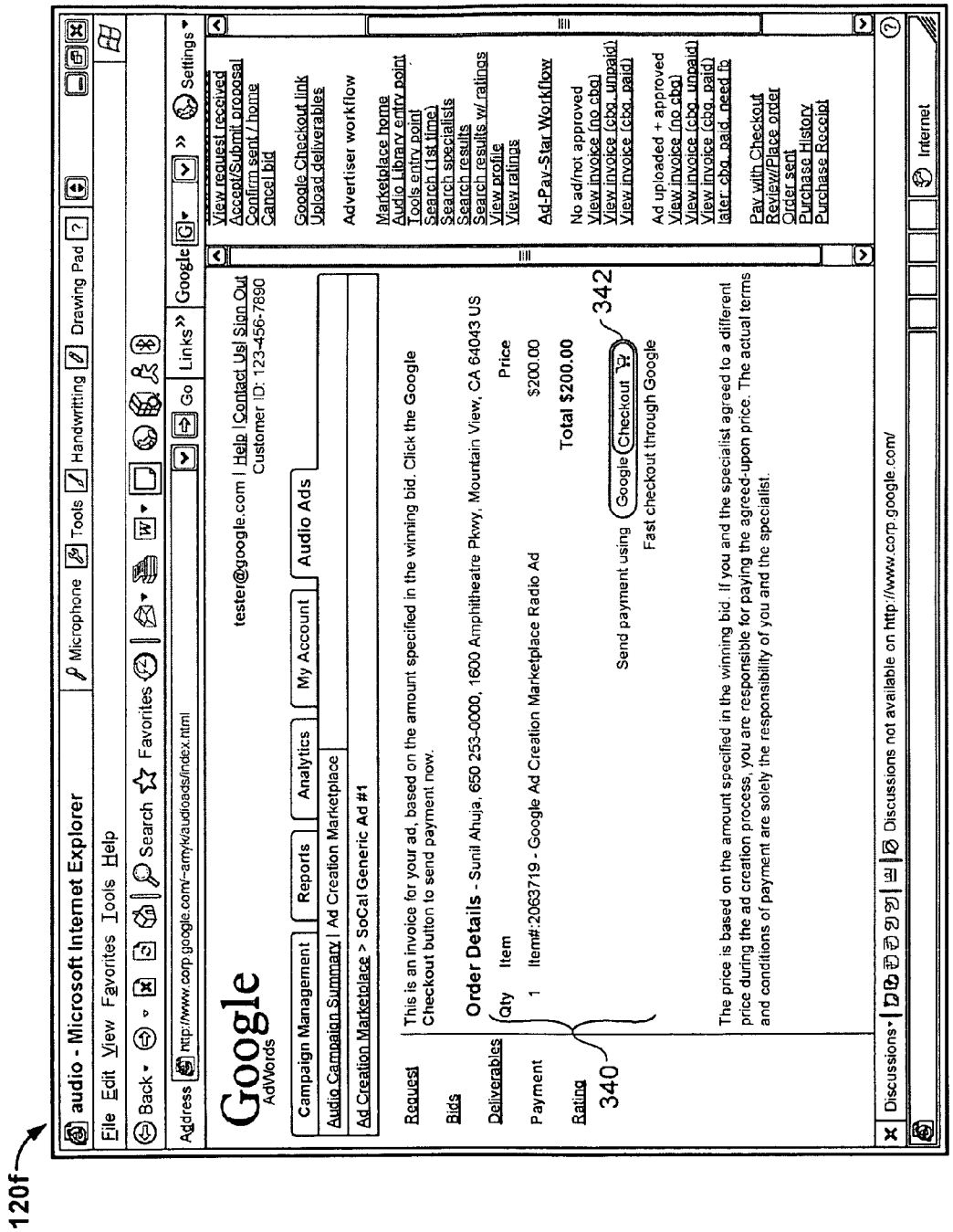
Figure 3G:
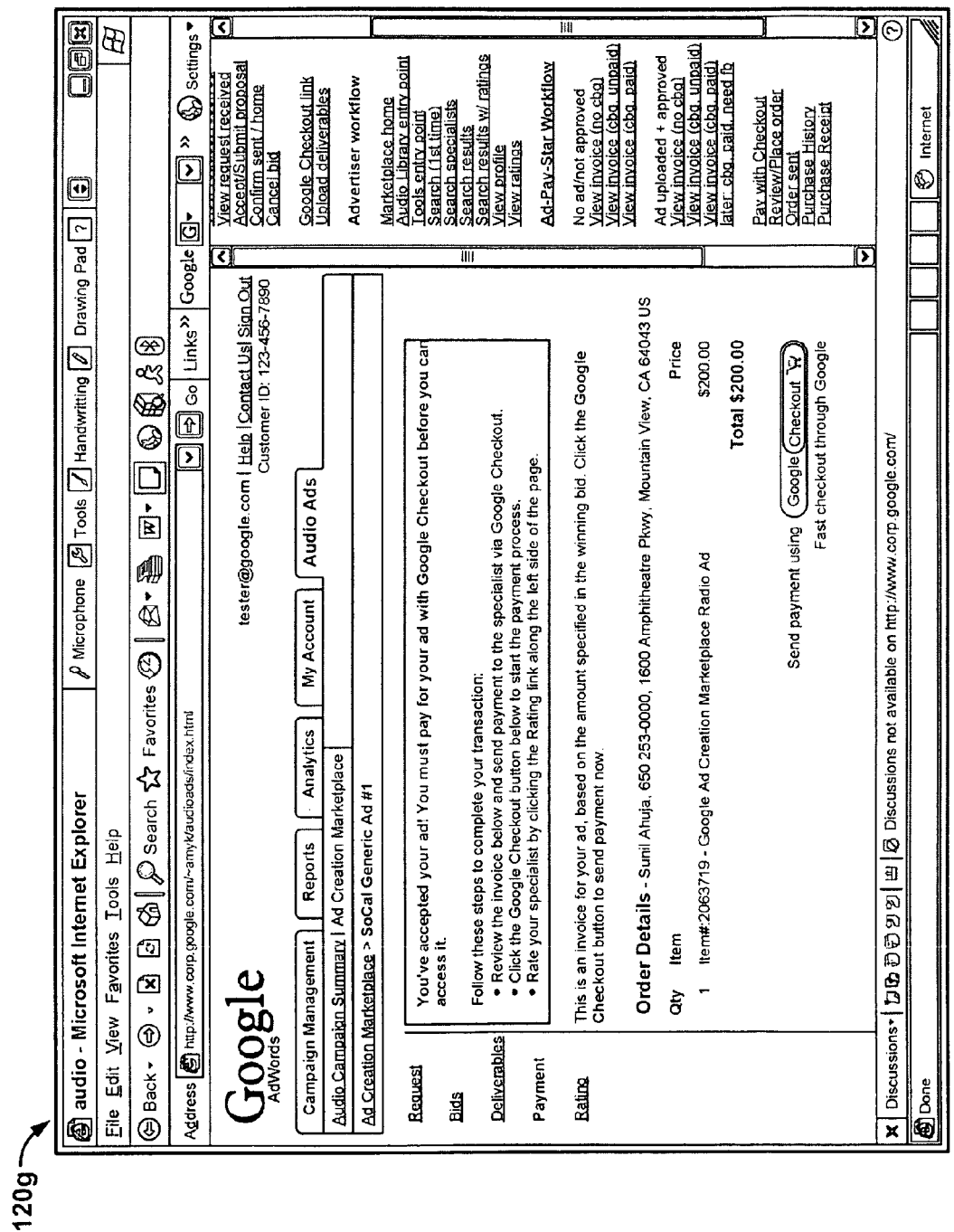

Referring to FIGS. 3F and 3G, the display 120f and the display 120g present information associated with an invoice of a requested ad. Prior to submitting payment for a requested ad, the user may view details associated with an ordered ad through the display 120f and 120g. In the illustrated implementations, the displays 120f and 120g include the invoice table 340. The invoice table 340 includes three columns: Quantity, Item, and Price. In the case that the user has ordered more than one ad, the invoice table 340 may present a plurality of ordered items and present a total cost. The user may proceed to submitting a payment for the items by selecting the graphic button 342. In some implementations, the system 200 may hold the requested ad 130 until payment is confirmed or otherwise verified, as indicated in the display 120g.

Figure 4:
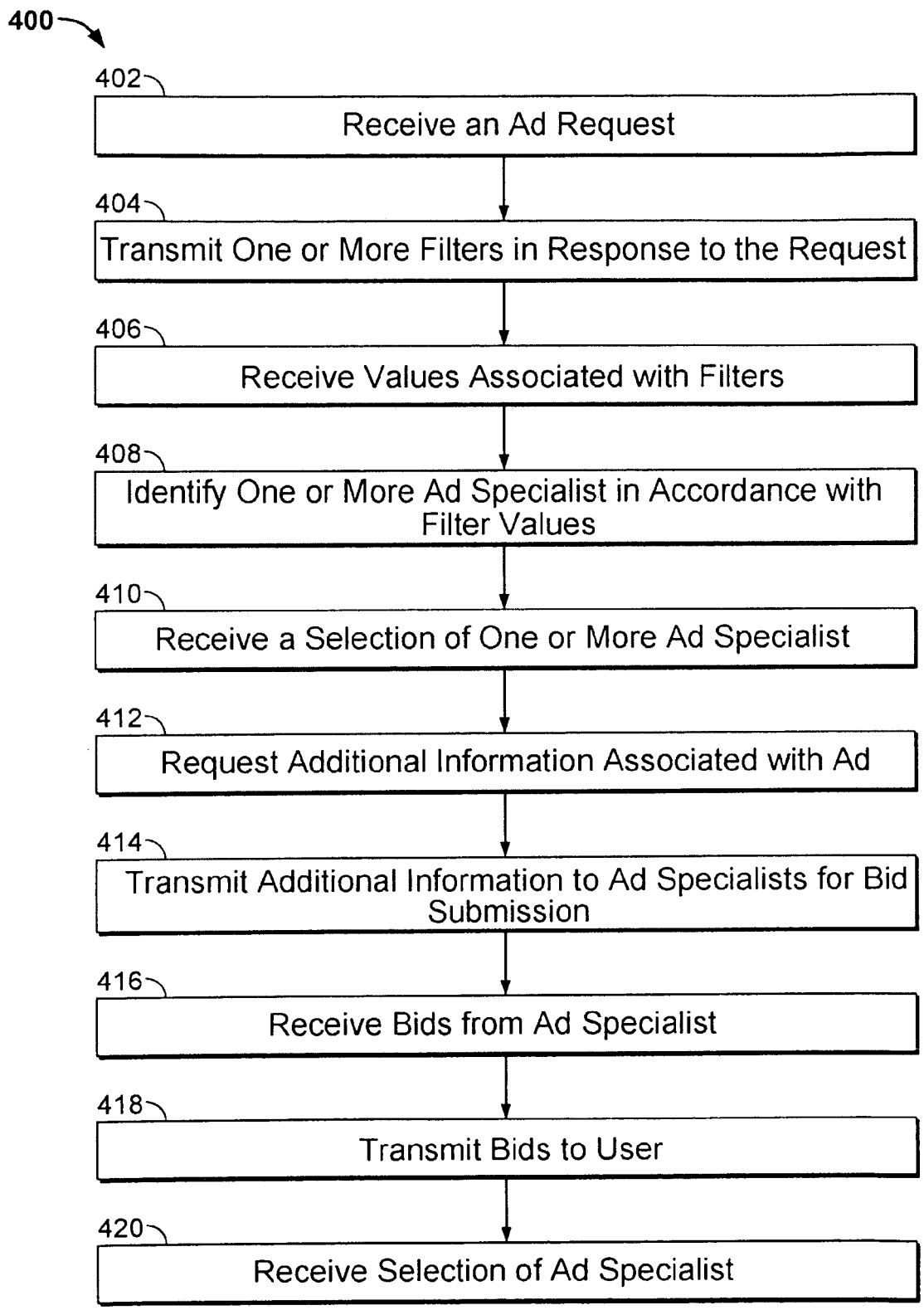
FIG. 4 is a flow chart illustrating an example method for identifying one or more advertising specialist.

FIG. 4 is a flowchart illustrating an example method 400 for identifying ad specialist in accordance with some implementations of the present disclosure. Generally, method 400 describes an example technique where ad specialist are selected in accordance with a user request. System 100 contemplates using any appropriate combination and arrangement of logical elements implementing some or all of the described functionality.

Method 400 begins at step 402 where a request for an ad is received. For example, the request engine 132 may receive a request to initiate an ad creation process from the client 102. At step 404, one or more filters are transmitted in response to at least the ad request. In the example, the request engine 132 may transmit a Web page 120 including one or more filters associated with the request ad 130 and/or ad specialists. Values for the one or more filters is received at step 406. Again in the example, the request engine 132 may receive values selected or otherwise provided by the user and generate and/or update a request profile 122 associated with the request ad 130. Next, at step 408, one or more ad specialist are identified in accordance with the filter values. In the example, the request engine 132 may identify one or more ad specialist using the specialist profiles 124 and the filter values. A selection of one or more ad specialist is received at step 410. Turning to the example, the request engine 132 may receive a selection of one or more ad specialist from the identified specialist from the user. At step 412, a request for additional information associated with the requested ad 130 is transmitted. In the example, the request engine 132 transmits a request for additional information and updates the associated request profiles 122 in accordance with the additional information. A request to submit bids is transmitted to ad specialist at step 414. Next, at step 416, bids are received from the ad specialist. In the example, the request engine 132 may receive bids from selected ad specialist and generate one or more bid files 128 in accordance with the received information. The bids are transmitted to the user at step 418 and, at step 420, a selection of an ad specialist is received.

Figure 5:
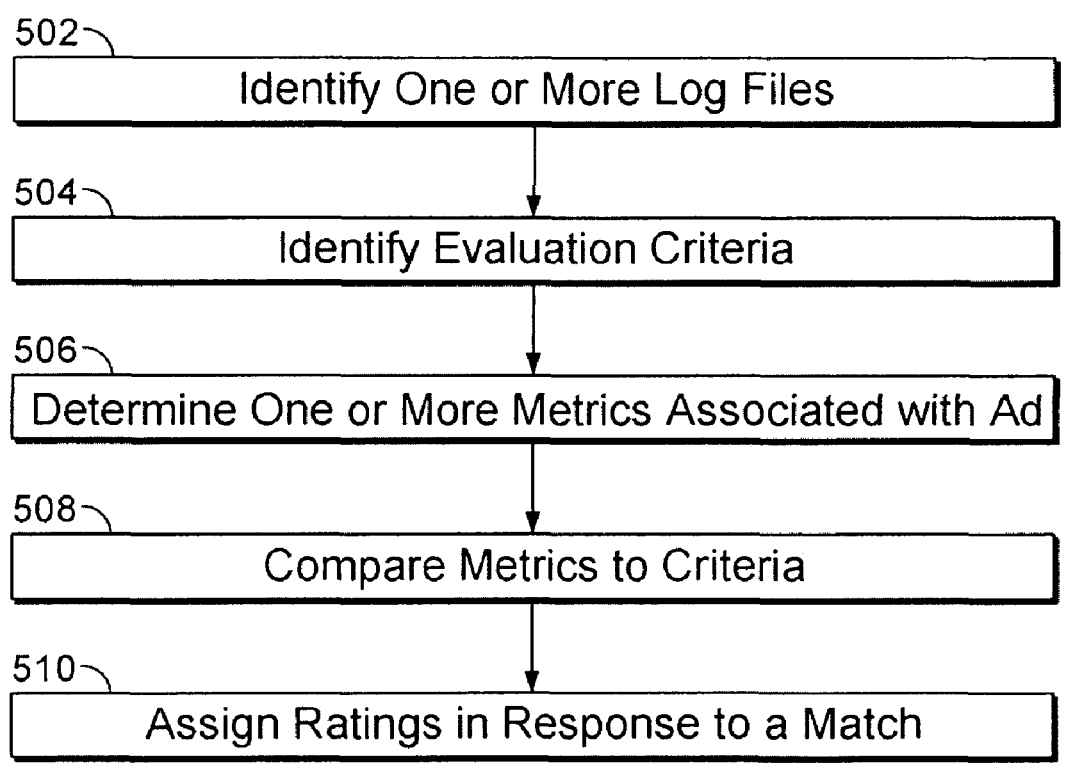
FIG. 5 is a flow chart illustrating an example method for determine one or more metrics associated with an advertising specialist.

FIG. 5 is a flowchart illustrating an example method 500 for determining one or more metrics associated with an ad specialist in accordance with some implementations of the present disclosure. Generally, method 500 describes an example technique where ad specialist are selected in accordance with a user request. System 200 contemplates using any appropriate combination and arrangement of logical elements implementing some or all of the described functionality.

Method 500 begins at step 502 where one or more log files are identified 502. For example, the evaluation engine 220 may identify one or more log files 214 associated with a request ad 130. At step 504, evaluation criteria is identified. In the example, the evaluation engine 220 identifies evaluation criteria 216. One or more metrics associated with the ad is determined using the criteria and the identified log files at step 506. Turning to the example, the evaluation engine 220 determines one or more metrics associated with the requested ad 130 using the log files 214 and the evaluation criteria 216. At step 508, the one or more metrics is compared to the evaluation criteria and, based at least in part on the comparison, one or more ratings are assigned to the ad specialist. As for the example, the evaluation engine 220 generates and/or updates one or more rating profiles 126 associated with the ad specialist in response to at least the metrics satisfying certain criteria 216.

Although this disclosure has been described in terms of certain implementations and generally associated methods, alterations and permutations of these implementations and methods will be apparent to those skilled in the art.

What is claimed is:

1. A computer-implemented method, comprising:
   selecting, by a computer based at least in part on one or more filter values, an ad specialist to produce an advertisement;
   receiving, by the computer, an indication from a user that the advertisement produced by the ad specialist is accepted;
   determining that the ad specialist has received payment for the advertisement; and
   providing the user access to the advertisement in response to at least the payment determination.

2. The computer-implemented method of claim 1, further comprising:
   identifying a type of payment associated with the advertisement;
   determining a payment for creating the advertisement in accordance with the type of payment; and
   transmitting to the user information associated with an invoice of the advertisement.

3. The computer-implemented method of claim 2, wherein the type of pay comprises one of a buyout or a pay per play.

4. Software for providing access to an advertisement comprising computer readable instructions embodied on computer storage media and operable to:
   select, based at least in part on one or more filter values, an ad specialist to produce an advertisement;
   receive an indication from a user that the advertisement produced by the ad specialist is accepted;
   determine that the ad specialist has received payment for the advertisement; and
   provide the user access to the advertisement in response to at least the payment determination.

5. The software of claim 4, further operable to:
   identify a type of payment associated with the advertisement;
   determine a payment for creating the advertisement in accordance with the type of payment; and
   transmit to the user information associated with an invoice of the advertisement.

6. The software of claim 5, wherein the type of pay comprises one of a buyout or a pay per play.

7. A server for providing access to an advertisement comprising one or more processors operable to:
   select, based at least in part on one or more filter values, an ad specialist to produce an advertisement;
   receive an indication from a user that the advertisement produced by the ad specialist is accepted;
   determine that the ad specialist has received payment for the advertisement; and
   provide the user access to the advertisement in response to at least the payment determination.

8. The server of claim 7, further operable to:
   identify a type of payment associated with the advertisement;
   determine a payment for creating the advertisement in accordance with the type of payment; and
   transmit to the user information associated with an invoice of the advertisement.

9. The server of claim 7, wherein the type of pay comprises one of a buyout or a pay per play.

* * * * *